Dec. 22, 1925.
T. E. BRALEY
PISTON PACKING
Filed Aug. 6, 1925
1,566,367
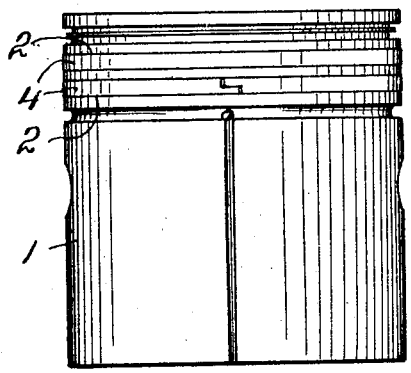
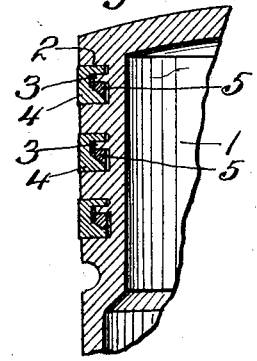
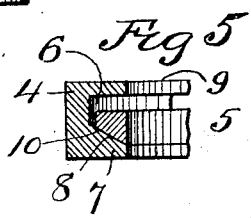
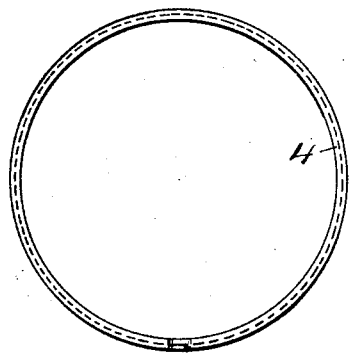
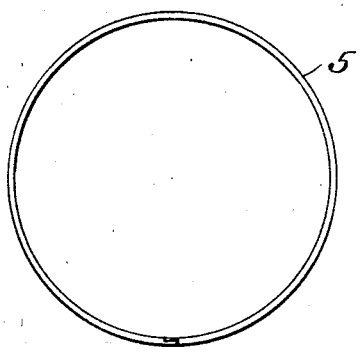
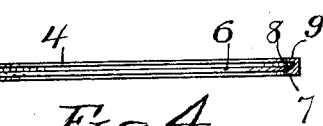
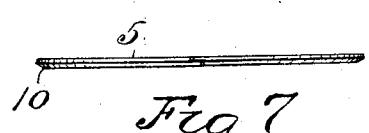
Witness:
R. C. Hamilton
INVENTOR.
Thomas E. Braley
BY
Warren L. House
His ATTORNEY.

Patented Dec. 22, 1925.

1,566,367

UNITED STATES PATENT OFFICE.

THOMAS E. BRALEY, OF WICHITA, KANSAS, ASSIGNOR OF ONE-HALF TO JOEL E. DAVIS, OF WICHITA, KANSAS.

PISTON PACKING.

Application filed August 6, 1925. Serial No. 48,540.

*To all whom it may concern:*

Be it known that I, THOMAS E. BRALEY, a citizen of the United States, and a resident of Wichita, in the county of Sedgwick and State of Kansas, have invented a certain new and useful Improvement in Piston Packings, of which the following is a specification.

My invention relates to improvements in piston packings. It is particularly well adapted for use in connection with pistons of explosive engines.

One of the objects of my invention is to provide novel piston packing means which is simple, cheap, durable, not liable to get out of order, which will make a tight seal between the piston and the cylinder associated therewith, which is efficient in operation and which may be readily adapted to pistons now in use.

A further object of my invention is to provide a novel piston ring which is cheap, easily manufactured, and which is adapted for use in connection with another piston ring to form therewith and with a piston a packing which will permit a minimum of leakage around it.

The novel features of my invention are hereinafter fully described and claimed.

In the accompanying drawing which illustrates the preferred embodiment of my invention, Fig. 1 is an elevation of a piston provided with my improvement.

Fig. 2 is a fragmental longitudinal sectional view of the same.

Fig. 3 is a plan view of the outer piston ring.

Fig. 4 is a cross section of the outer piston ring.

Fig. 5 is an enlarged cross section of the inner and outer piston rings in their operative positions with respect to each other.

Fig. 6 is a plan view of the inner piston ring.

Fig. 7 is an edge view of the inner piston ring.

Similar reference characters designates similar parts in the different views.

1 designates the body of a hollow piston having an open outer end and a closed inner end, and which is provided with one or more annular peripheral grooves 2 in each of which is provided an annular circumferential rib 3.

Adapted to be respectively mounted in the grooves 2 are outer transversely divided piston rings 4, and respectively fitted in the rings 4 and in the grooves 2 are inner transversely divided piston rings 5.

The rings 4 are alike in construction, as are the rings 5 and grooves 2, so that a description of one pair of rings and the groove in which they are located will suffice for all.

Each ring 4 has in its inner side an annular channel 6 having annular radial flanges 7 and 9, and one plane side of the ring 4 is adapted to bear against the outer side of the adjacent groove 2. The outer flange 7 of the channel ring 4 has its inner side provided with an annular beveled bearing surface 8 which inclines outwardly toward the other flange 9 of the ring 4. The flange 9 is adapted to be disposed between the adjacent rib 3 and the inner wall of the groove 2 in which the ring 4 is located.

The inner piston ring 5 is located between the rib 3 and the beveled surface 8, the ring 5 having an annular beveled surface 10 at one side which is adapted to have a sliding bearing against the surface 8. The other side of the ring 5 is a plane which is adapted to bear against the rib 3.

Pressure from the closed inner end of the piston 1 will cause the outer flanges 7 of the rings 4 to bear against the outer sides respectively of the grooves 2, and such pressure will tend to force the inner rings 5 outwardly, so that their plane sides will bear against the ribs 3 respectively, and the beveled sides 10 will respectively bear against the beveled surfaces 8, which will force the other sides of the rings 5 tightly against the ribs 3 respectively, thus effecting a tight seal between the piston 1 and the cylinder in which it is adapted to operate.

By reason of the construction described, the rings 4 and rings 5 may be relatively loosely fitted in the grooves, as the inner rings 5 and rings 4 will be forced by the pressure in the cylinder to make a tight seal at each groove 2.

In assembling the rings, the rings 5 are first sprung into the grooves 2 respectively, after which the rings 4 are sprung respectively into said grooves so as to properly engage with the rings 5.

I do not limit my invention to the structure shown and described, as modifications, within the scope of the appended claims, may be made without departing from the spirit of my invention.

What I claim is:—

1. In piston packing, a transversely divided piston ring having an annular channel on its inner side and adapted to be fitted in a peripheral groove in a piston, the inner side of one of the flanges of the channel ring having a beveled bearing surface of annular form which inclines outwardly toward the other flange of the ring, and an inner transversely divided piston ring adapted to be fitted in the channel of the other ring and having one plane side adapted to bear against the piston and having its other side provided with an annular beveled surface adapted to fit said beveled surface of the other ring.

2. In piston packing, the combination with a piston having an annular peripheral groove and an annular rib in said groove, of a transversely divided outer piston ring adapted to be fitted in said groove and to bear at one side against the piston at one side of said groove, and having in its inner side an annular channel, the inner side of one of the flanges of the channel ring having a beveled bearing surface of annular form which inclines outwardly toward the other flange of the ring, and an inner transversely divided piston ring adapted to be fitted in said channel and to bear at one side against said rib and having its other side provided with an annular beveled surface adapted to fit against the said beveled surface of the other ring.

In testimony whereof I have signed my name to this specification.

THOMAS E. BRALEY.